United States Patent Office 3,378,553
Patented Apr. 16, 1968

3,378,553
SUBSTITUTED 1,4 - BIS($\beta$ - PHENYL - $\beta$ - ACYLOXY-ETHYL)PIPERAZINES AND THEIR PHARMACEUTICALLY ACCEPTABLE ACID ADDITION SALTS
Wolf-Dieter Vigelius, Memmingen, Germany, assignor to Warner-Lambert Pharmaceutical Company, Morris Plains, N.J., a corporation of Delaware
No Drawing. Filed Feb. 11, 1965, Ser. No. 432,016
30 Claims. (Cl. 260—240)

This invention relates to certain new and novel 1,4-bis-(substituted)-piperazine derivatives. More particularly, the present invention relates to 1,4-bis(substituted)-piperazine derivatives of the formula:

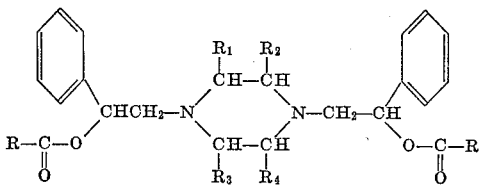

wherein R represents substituted or unsubstituted, low- to intermediate-molecular weight aliphatic, aromatic or arylaliphatic hydrocarbon groups, and $R_1$, $R_2$, $R_3$ and $R_4$ are members of the group consisting of hydrogen, or low molecular weight aliphatic hydrocarbon groups; and the non-toxic pharmaceutically acceptable acid addition salts thereof. The present invention also relates to a method for preparing these 1,4-bis(substituted)-piperazine derivatives.

In accordance with the present invention, it has now been found that new and novel 1,4-bis(substituted)-piperazine derivatives having useful pharmaceutical properties may be prepared without having many objectionable properties which characterize similarly useful compounds known heretofore.

It is, therefore, an object of this invention to provide a series of synthetic compounds which are physiologically-active and which are not generally subject to objectionable properties under physiological conditions which frequently characterize other known compounds similarly useful.

It is a further object of this invention to provide new compounds having useful therapeutic applications without major side effects or high toxicity.

It is another object of this invention to provide a method of preparing 1,4-bis(substituted)-piperazine derivatives having useful pharmaceutical activity.

Further objects and advantages will become more apparent from the accompanying disclosure.

According to the present invention, compounds possessing useful therapeutic activity may be prepared by esterifying 1,4-bis($\beta$-phenyl-$\beta$-hydroxyethyl)piperazines with either the corresponding acid anhydrides or the corresponding acyl chlorides with the addition according to the following reaction scheme:

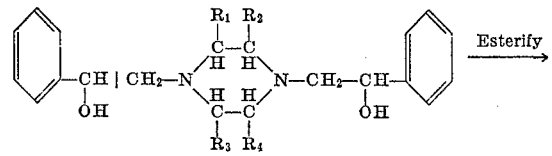

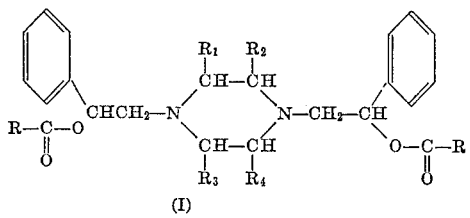
(I)

wherein R, $R_1$ $R_2$, $R_3$ and $R_4$ are members previously defined.

The 1,4-bis($\beta$-phenyl-$\beta$-hydroxyethyl)piperazines esterified according to reaction I with or without substituents on the piperazine ring, may be prepared by reacting the corresponding piperazine with styrene oxide according to the following reaction scheme:

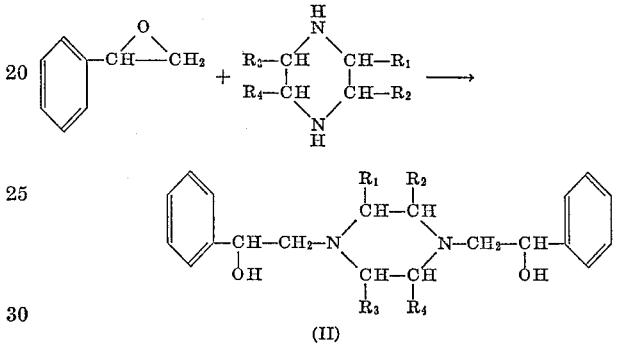
(II)

In order to further illustrate the present invention in greater detail, the following examples are given:

Example 1.—1,4-bis($\beta$-phenyl-$\beta$-propionyloxyethyl) piperazine dihydrochloride 1 mol of piperazine is dissolved in ½ liter of alcohol, heated to boiling and mixed slowly with a solution of 2 mols styrene oxide in ⅛ liter of alcohol. After filtration, the residue is washed with alcohol and ether. The dried precipitate, which consists of a mixture of the two diastereoisomers of 1,4-bis($\beta$-phenyl - $\beta$ - hydroxyethyl) piperazine is found to have a melting point of 210–225° C. 0.5 mol of the dried precipitate is boiled for one-half hour with the same amount of weight of propionic acid anhydride, after which the propionic acid and propionic acid anhydride are driven off on the water bath in a vacuum. The recovered product is then re-crystallized twice from ⅓ liter of ligroin. The higher-melting basic ester 1,4-bis($\beta$-phenyl-$\beta$-propionyloxyethyl) piperazine so obtained is found to have a melting point of 106–107° C. The basic ester is next dissolved in 10 times the amount of methanol, heated to boiling and treated with concentrated HCl until there is a definite acidic reaction. The precipitated 1,4-bis($\beta$-phenyl-$\beta$-propionyloxyethyl)piperazine dihydrochloride which forms on cooling is filtered off, washed with methanol and ether and dried (M.P. 224–224.5° C.). Additional acid addition products may also be obtained by processing the mother liquor in the usual way.

The dihydrochloride of the other diastereoisomer is obtained by evaporating the mother liquor from the first basic ester, taking up the residue in ether, saturating the ether solution with dry HCl and recrystallizing the precipitate several times from dilute methanol (M.P. 225–226°

C.). The lower-melting basic ester 1,4-bis(β-phenyl-β-propionyloxyethyl)piperazine so obtained and recrystalized from ligroin is found to have a melting point of 54–55° C.

Example 2.—1,4-bis[β-phenyl-β-(diphenylacetoxy) ethyl]piperazine dihydrochloride 1 mol of 1,4-bis(β-phenyl-β-hydroxyethyl)piperazine and 2 mols of triethylamine are dissolved in 4.5 liters of hot dimethylformamide, slowly mixed with 2 mols of diphenylacetylchloride and heated at 110° C. for 2 hours. After cooling, the precipitate is filtered off, washed dry with methanol and ether and crystallized from 1 liter of dimethylformamide. After the product is dissolved in 2 liters of chloroform, the resulting solution is saturated with dry HCl, an equivalent amount of ether is next added, and the precipitated dihydrochloride (M.P. 224–225° C.) recovered is recrystallized from 2.5 liters of butanol.

Example 3.—trans-1,4-bis(β-phenyl-β-acetoxyethyl)-2,5-dimethylpiperazine 1 mol of trans-2,5-dimethylpiperazine, 2 mols of styrene oxide and 250 ml. of n-butanol is boiled for 3 hours under a reflux condenser. The product which crystallized out on cooling is filtered off and recrystallized first from a liter of butanol and thereafter from 10 liters of ethanol. The high-melting trans-1,4-bis(β-phenyl-β-hydroxyethyl)-2,5-dimethylpiperazine so obtained is found to have a melting point of 204–206° C.

The low-melting trans - 1,4 - bis(β-phenyl-β-hydroxyethyl)-2,5-dimethylpiperazine, obtained in crystalline form by concentrating the ethanolic mother liquor to about 330 ml. and cooling, is found to have a melting point of 150–1° C.

1 mol of the high-melting trans-1,4-bis(β-phenyl-β-hydroxyethyl)-2,5-dimethylpiperazine is boiled for 1 hour in an equal weight of acetic anhydride, after which the acetic anhydride is removed from the mixture in a vacuum on the water bath. The residue is recrystallized 3 times from 500 ml. of a 2:1 mixture of hexane and benzene. The high-melting trans-1,4-bis(β-phenyl-β-acetoxyethyl)-2,5-dimethylpiperazine so obtained is found to have a melting point of 156–7° C.

1 mol of the low-melting trans-1,4-bis(β-phenyl-β-hydroxyethyl)-2,5-dimethylpiperazine is boiled for 1 hour with an equal weight of acetic anhydride, after which the acetic anhydride is removed from the mixture in a vacuum on the water bath. The oily residue is triturated with 250 ml. of hexane, after which the solids are filtered off and recrystallized twice from 500 ml. of hexane. The low-melting trans - 1,4 - bis(β-phenyl-β-acetoxyethyl)2,5-dimethylpiperazine so obtained has a melting point of 124–6° C. and is based on a diastereoisomer of trans-1,4-bis (β-phenyl-β-hydroxyethyl)-2,5-dimethylpiperazine having a melting point of 171–2° C. which is obtained by alkaline saponification of the basic ester in the usual way.

The filtrate obtained during the preparation of the low-melting trans - 1,4 - bis(β-phenyl-β-acetoxyethyl)-2,5-dimethylpiperazine is evaporated to dryness and the residue is dissolved in 1 liter of ether. The solution is next saturated with dry HCl and the prepared hydrochloride is then filtered off and recrystallized from 250 ml. of ethanol. The dihydrochloride of the liquid trans-1,4-bis(β-phenyl-β-acetoxyethyl)-2,5-dimethylpiperazine so obtained is found to have a melting point of 207–9° C.

The following compounds are prepared in a similar way according to Examples 1–3.

Example 4.—1,4-Bis(β-phenyl-β-acetoxyethyl)piperazine (lower-melting base)

(The acetate ester of the lower-melting 1,4-bis(β-phenyl-β-hydroxyethyl)piperazine (M.P. 260–207° C.).) Melting point from ligroin as in Example 1 is 127–129° C.

Example 4A.—1,4-bis(β-phenyl-β-acetoxyethyl)piperazine (higher-melting base)

(The acetate ester of the higher-melting 1,4-bis(β-phenyl-β-hydroxyethyl)piperazine (M.P. 235–236° C.).) Melting point from ligroin as in Example 1 is 147.5–148° C.

Example 5.—1,4 - bis(β-phenyl-β-butyryloxyethyl) piperazine dihydrochloride (basic ester, M.P. 110–111° C. from ligroin)

Melting point from isopropanol as in Example 1 is 218–219° C.

Example 6.—1,4-Bis(β-phenyl-β-valeryloxyethyl) piperazine (base)

Melting point from ligroin as in Example 2 is 113–115° C.

Example 7.—1,4-bis(β-phenyl-β-(methoxyacetoxy) ethyl piperazine dioxalate

Melting point (decomp.) from alcohol as in Example 2 is 189° C.

Example 8.—1,4-Bis[β-phenyl-β-(chloroacetoxy)ethyl] piperazine dihydrochloride

Melting point from methanol as in Example 1 is 216–220° C.

Example 9.—1,4-bis(β-phenyl-β-benzoyloxyethyl) piperazine (base)

Melting point from ethylacetate as in Example 1 is 177–179° C.

Example 10.—1,4-bis[β-phenyl-β-(phenylacetoxy) ethyl]piperazine dihydrochloride

Melting point from glacial acetic acid as in Example 2 is 210–212° C.

Example 11.—1,4 - bis(β - phenyl-β-cinnamoyloxyethyl) piperazine dihydrochloride (basic ester, M.P. 202° C. from toluene)

Melting point from glacial acetic acid as in Example 2 is 235–237° C.

Example 12.—1,4-bis[β-phenyl-β-(o-nitrobenzoyloxy) ethyl]piperazine (base)

Melting point from butanol as in Example 2 is 168–170° C.

Example 13.—1,4 - bis[β - phenyl-β-(p-nitrobenzoyloxy ethyl]piperazine (mixture of the diastereoisomeric bases).

Melting point from butanol as in Example 2 is 147–174° C.

Example 14.—1,4 - bis[β-phenyl-β-(p-aminobenzoyloxy) ethyl]piperazine (base)

Melting point from alcohol is 169–170° C.

Example 15.—1,4-bis[β-phenyl-β-(3,4,5-trimethoxy-benzoyloxy ethyl)]piperazine (base)

Melting point from n-butanol as in Example 2 is 189–191° C.

Example 16.—trans-1,4-bis(β-phenyl-β-propionyloxethyl)-2,5-dimethylpiperazine (higher-melting base) (prepared from the higher-melting basic alcohol)

Melting point from hexane as in Example 3 is 118–119° C.

Example 17.—trans-1,4 - bis(β-phenyl - β - propionyloxyethyl) - 2,5 - dimethylpiperazine (lower-melting base) (prepared from the lower-melting basic alcohol)

Melting point from hexane as in Example 3 is 104–105° C.

Example 18.—trans-1,4-bis(β - phenyl - β - propionyloxyethyl)-2,5-dimethylpiperazine dihydrochloride (liquid basic ester, B.P.=225–6° C. (0.01 torr)) (derived from a basic alcohol with a melting point of 171–2° C.

Melting point from ethanol as in Example 3 is 201–202° C.

Example 19.—cis-1,4-(β-phenyl-β-acetoxyethyl) - 2,5 - dimethylpiperazine (base) (basic alcohol, M.P.=157–8° C. from alcohol)

Melting point from hexane as in Example 3 is 90–91° C.

Example 20.—cis-1,4 - bis(β - phenyl - β - propionyloxyethyl)-2,5-dimethylpiperazine (base) (basic alcohol as in the previous example)

Melting point from hexane as in Example 3 is 85–86° C.

Example 21.—1,4 - bis(β-phenyl-β-acetoxyethyl)-2,3,5,6-tetramethylpiperazine hydrochloride (basic alcohol, M.P. 150–1° C. from ethanol).

Melting point from ethanol as in Example 3 is 210–220° C.

The term "aliphatic" as used in the specification and in the claims refers to straight, branched and substituted chain aliphatic groups and containing from 1 to 6 carbon atoms in the low molecular weight range and from 7 to 18 carbon atoms in the intermediate molecular weight range. These aliphatic groups may be substituted by radicals such as lower alkoxy, halogen and by one or more aryl radicals.

The term "aromatic" includes substituted and unsubstituted aromatic groups such as phenyl, benzyl, and tolyl which may be substituted by one or more groups such as amino, nitro or lower alkoxy.

The term "arylaliphatic" represents hydrocarbons having a phenyl radical joined by a straight chain lower aliphatic group having from 1 to 6 carbon atoms.

The term "halogen" includes the radicals of chlorine, bromine, fluorine and iodine.

The term "aryl" represents groups such as phenyl, benzyl and tolyl while the term "lower alkoxy" represents groups having from 1 to 6 carbon atoms in each group.

1,4-bis(substituted)-piperazine derivatives of this invention have interesting pharmacological activity and are useful as anti-inflammatory, analgesic and anti-pyretic agents. In use these compounds may be formulated with conventional pharmaceutical carriers to form such typical dosage units as tablets, capsules, solutions, suspensions, suppositories and the like. It has been found that compounds of this invention may be also administered by injection with no apparent damage resulting to tissue. The hydrochloride salt of the present compounds is found to be particularly useful in this regard primarily for the ease of solubility. Other salts may be prepared and proved to be equally useful.

It is understood that the foregoing detailed description is given merely by way of illustration and that many variations may be made therein without departing from the spirit of this invention.

What is claimed is:

1. A member selected from the group consisting of a compound of the formula:

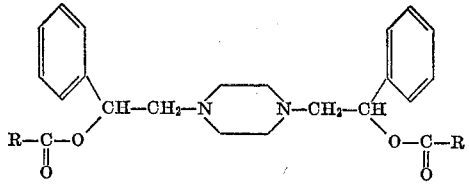

wherein R is a member selected from the group consisting of lower alkyl and substituted lower alkyl, wherein the substituent is a member selected from the group consisting of lower alkoxy, chloro, and phenyl, phenyl, tolyl, benzyl, styryl and substituted phenyl wherein the substituent is a member selected from the group consisting of nitro, amino and lower alkoxy, $R_1$, $R_2$, $R_3$, and $R_4$ are each a member selected from the group consisting of hydrogen and methyl.

2. 1,4-bis(β-phenyl-β-propionyloxyethyl)piperazine.

3. 1,4-bis(β-phenyl-β-propionyloxyethyl)piperazine dihydrochloride.

4. 1,4 - bis[β - phenyl - β - (diphenylacetoxy)ethyl] piperazine.

5. 1,4 - bis[β - phenyl β - (diphenylacetoxy)ethyl] piperazine dihydrochloride.

6. Trans - 1,4 - bis(β - phenyl - β - acetoxyethyl) - 2,5-dimethylpiperazine.

7. Trans - 1,4 - bis(β - phenyl - β - acetoxyethyl) - 2,5-dimethylpiperazine dihydrochloride.

8. 1,4-bis(β-phenyl-β-acetoxyethyl)piperazine.

9. 1,4-bis(β-phenyl-β-butyryloxyethyl)piperazine.

10. 1,4 - bis(β - phenyl - β - butyryloxyethyl)piperazine dihydrochloride.

11. 1,4-bis(β-phenyl-β-valeryloxyethyl)piperazine.

12. 1,4 - bis[β - phenyl - β - (methoxyacetoxy)ethyl] piperazine.

13. 1,4 - bis[β - phenyl - β - (methoxyacetoxy)ethyl] piperazine dioxalate.

14. 1,4 - bis[β - phenyl - β - (chloroacetoxy)ethyl] piperazine.

15. 1,4 - bis[β - phenyl - β - (chloroacetoxy)ethyl] piperazine dihydrochloride.

16. 1,4-bis(β-phenyl-β-benzoyloxyethyl)piperzine.

17. 1,4 - bis[β - phenyl - β - (phenylacetoxy)ethyl] piperazine.

18. 1,4 - bis[β - phenyl - β - (phenylacetoxy)ethyl] piperazine dihydrochloride.

19. 1,4-bis(β-phenyl-β-cinnamoyloxyethyl)piperazine.

20. 1,4 - bis - (β - phenyl - β - cinnamoyloxyethyl) piperazine dihydrochloride.

21. 1,4 - bis[β - phenyl - β - (o-nitrobenzoyloxy)ethyl] piperazine.

22. 1,4 - bis[β - phenyl - β - (p-nitrobenzoyloxy)ethyl] piperazine.

23. 1,4 - bis[β - phenyl - β - (p - aminobenzoyloxy) ethyl]piperazine.

24. 1,4 - bis[β - phenyl - β - (3,4,5 - trimethoxybenzoyloxyethyl) ]piperazine.

25. Trans - 1,4 - bis(β - phenyl - β - propionyloxyethyl)-2,5-dimethylpiperazine.

26. Trans - 1,4 - bis(β - phenyl - β - propionyloxyethyl)-2,5-dimethyl piperazine dihydrochloride.

27. Cis - 1,4 - (β - phenyl - β - acetoxyethyl) - 2,5 - dimethylpiperazine.

28. Cis - 1,4 - (β - phenyl - β - propionyloxyethyl) - 2,5-dimethylpiperazine.

29. 1,4 - bis(β - phenyl - β - acetoxyethyl) - 2,3,5,6-tetramethylpiperazine.

30. 1,4 - bis(β - phenyl - β - acetoxyethyl) - 2,3,5,6-tetramethylpiperazine hydrochloride.

References Cited

UNITED STATES PATENTS 2,995,554  8/1961  Biel _____ 260—268

OTHER REFERENCES

Lespanol et al.: Chem. Abst. vol. 53 (1959), col. 21, 929b.

HENRY R. JILES, *Primary Examiner.*

ALEX MAZEL, *Examiner.*